Aug. 21, 1934.  A. MAIER  1,971,045

CHANGE SPEED GEAR

Filed July 28, 1933   2 Sheets-Sheet 2

Inventor: Albert Maier

Patented Aug. 21, 1934

1,971,045

UNITED STATES PATENT OFFICE 1,971,045

CHANGE SPEED GEAR

Albert Maier, Friedrichshafen, Germany, assignor to Zahnradfabrik Friedrichshafen Aktiengesellschaft, Friedrichshafen, Germany Application July 28, 1933, Serial No. 682,560
In Germany August 29, 1932

1 Claim. (Cl. 74—59)

My invention relates to change speed gears, especially to gears of this kind which are provided with a free-wheeling mechanism allowing for the driven shaft to overrun the driving shaft.

In gears of this kind it is necessary to provide means for blocking the free-wheeling mechanism whenever it is intended to reverse the driving gear for the purpose of having the vehicle go backwards. To this end special clutches and the like are generally applied.

According to my invention it is not necessary to provide such special clutches, but the shafts in the change speed gear are so constructed and arranged that it is possible to reverse the outgoing shaft in spite of a free-wheeling mechanism being inserted in the gear case. Consequently, my change speed gear is comparatively compact and considerably lighter than other constructions for the same purposes.

In a change speed gear according to my invention the reversing shaft is made shiftable axially and one of its gears is adapted to come into direct engagement with a corresponding gear on the outgoing shaft, the free-wheeling mechanism being situated inside of the latter gear. Besides I provide a shiftable shaft portion in the main shaft train adapted to cause direct driving connection between the driving and the driven shaft, which are in alignment with each other and which are loosely surrounded by their gears, there being means of known design and construction for connecting and disconnecting these gears to and from their shafts.

Having given a general description of my invention I now want to point it out more in detail referring to the drawings which represent an example embodying my invention.

Fig. 2 is a cross section taken on line II—II of Fig. 1 seen towards the left, whereas

Figure 1:
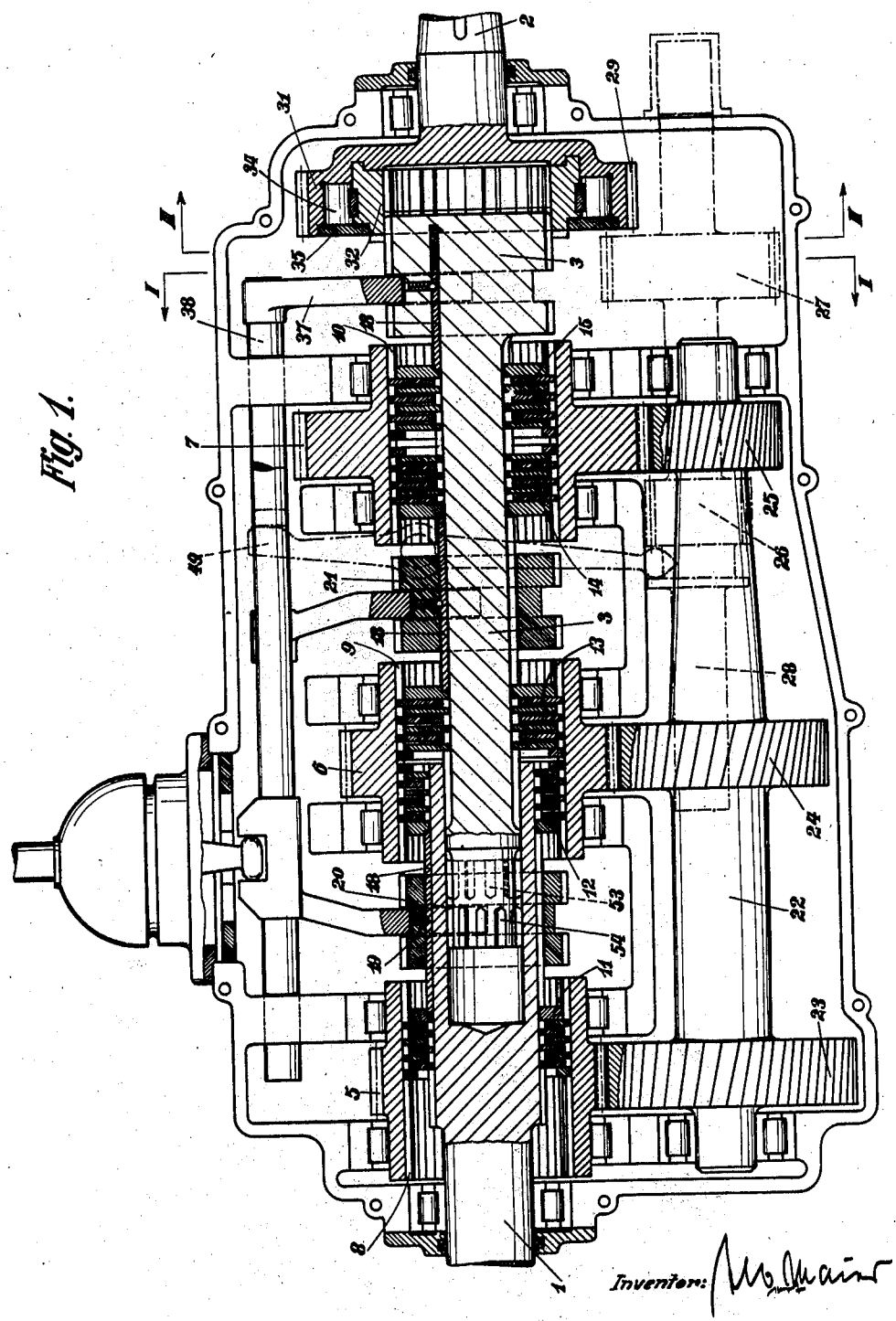
Fig. 1 is a longitudinal section through a four speed change speed gear.
Figure 2:
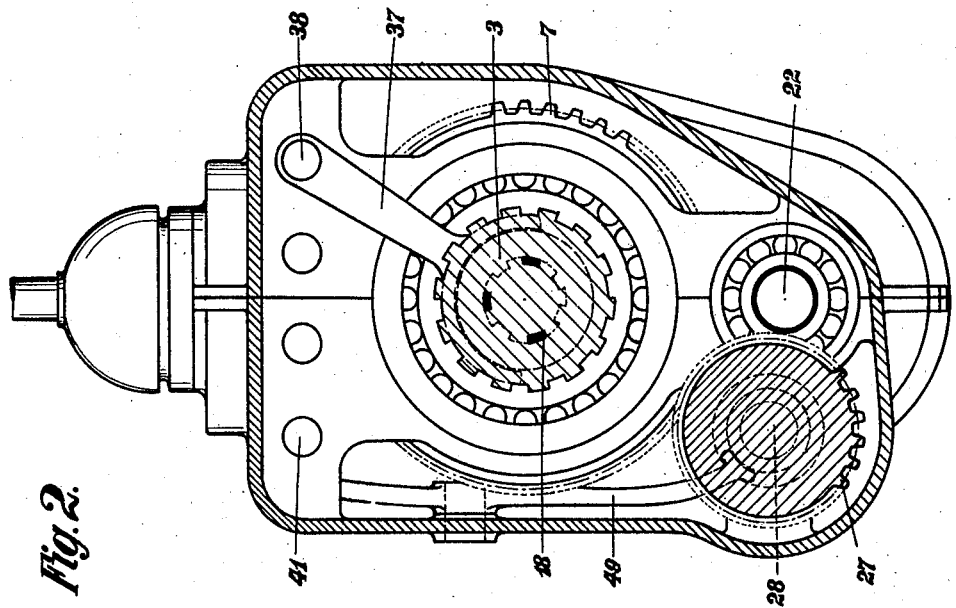
Figure 3:
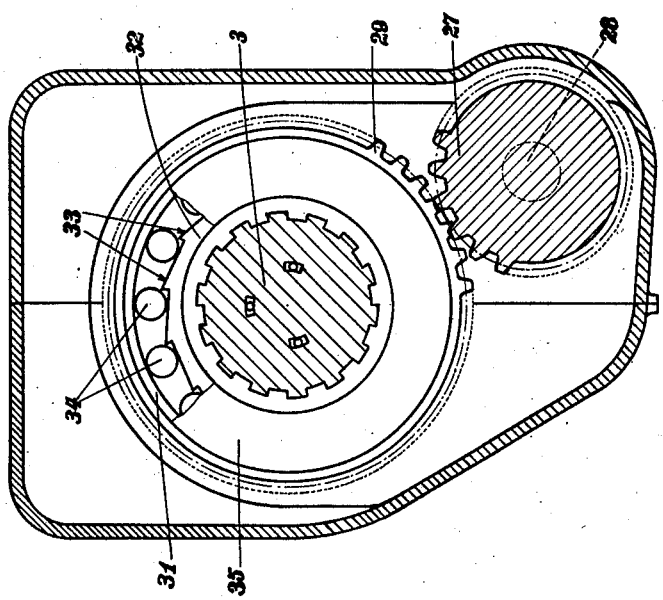
Fig. 3 is a cross section taken on line III—III of Fig. 1 seen towards the right.

The incoming or driving shaft 1 is in alignment with the outgoing or driven shaft 2. There is an intermediate shaft 3 adapted to be shifted axially by means of forked arm 37 connected to striker rod 38. The left hand end of shaft 3 extends into a bore of shaft 1, whereas its right hand end is surrounded by a free-wheeling mechanism 31, 34, 32, the inner ring 32 of which is splined to shaft 3 in such manner that shaft 3 is shiftable inside thereof. The left hand end of shaft 3 is provided with external teeth 54 adapted to come into engagement with the internal teeth 53 within the bore of shaft 1. In the drawings the teeth are represented as being out of engagement with each other, but if shaft 3 is shifted to the right these teeth come into engagement and direct driving connection exists between shafts 1 and 2. There is a third position for shaft 3, that is when shifted to the left so as to cause engagement between the inward teeth of gear 7 and the outward teeth of shaft 3 at its right hand end. In all three of these positions of shaft 3, the middle one, as shown in the drawings, and the two end positions, the outward teeth of shaft 3 at the right hand end are in driving engagement with the internal teeth of ring 32 of the free-wheeling mechanism. As the gears 5, 6 and 7 are loosely surrounding the shafts they do not even run idle but are at a stand still whenever there is direct driving connection between shafts 1 and 2.

For the purpose of connecting one or the other of said gears to the shaft it belongs to there are sleeves 20 and 21, respectively splined to shafts 1 and 2, respectively, and, having outward teeth adapted to engage with inward teeth 8, 9 and 10 within gears 5, 6 and 7, respectively. Furthermore, laminated friction clutches 11, 12, 13, 14 and 15 are provided inside of said gears for the purpose of equalizing the speeds of the parts to be connected before they are finally coupled. These clutches are operated by the respective sleeves, being shifted by means of bars or bolts 18 which are resiliently connected to the sleeves by means of balls 19 or the like being under spring pressure. If the shifting force on the sleeves exceeds a certain limit the connection to the bolts 18 is interrupted because the balls 19 are pressed backwards against the spring pressure out of the recesses in the bolts 18, so that the friction clutches are automatically released just before the sleeve and the gear to be coupled are finally in engagement. Shaft 3 has longitudinal splines which serve for causing clutch plates 15 to rotate together with the shaft as well as for lodging bars 18; consequently shifting of shaft 3 has no influence on the friction clutches and their operating means.

The free-wheeling mechanism between shaft 2 and shaft 3 comprises an inner element 32 having internal teeth adapted to co-operate with the external teeth of shaft 3 and being provided with inclined step surfaces 33 on its outer circumference. The outer element 31 is made integral with shaft 2. Rollers 34 are inserted between the outer and the inner elements, and ring member 35 is provided for preventing the rollers 34 from being shifted sideways out of their position. The outer element 32 on its outer circumference is provided with external teeth 29 adapted to engage with gear 27 which forms part of the reversing shaft 28. This shaft has a second gear 26 fixed thereto, and if shaft 28 is shifted to the right by means of lever 49 and striker rod 41 gear 26 gets into engagement with gear 25 on lay shaft 22 and at the same time gear 27 meshes with the teeth 29 of the free-wheeling device. Consequently, in this position shaft 2 is reversed.

In the first speed gear 5 is connected to shaft 1 by shifting sleeve 20 to the left and gear 7 is connected to shaft 3 by shifting this shaft to the left. Gear 5 then drives gear 23 on the lay shaft 22 and gear 25 drives gear 7.

In the second speed sleeve 20 is shifted to the right so as to connect gear 6 to shaft 1, shaft 3 is shifted back to its middle position, as in the drawings, and sleeve 21 being also shifted to the right causes connection between shaft 3 and gear 7. Consequently, gear 6 drives gear 24 on the lay shaft 22 and gear 25 drives gear 7.

In the third speed sleeve 20 is moved backwards into its left end position again connecting gear 5 to shaft 1 and at the same time sleeve 21 is also shifted to the left so as to connect gear 6 to shaft 3. Thus, now gear 5 drives gear 23 on the lay shaft and gear 24 drives gear 6.

For attaining direct drive sleeves 20 and 21 are shifted into their median idle positions by shifting them to the right and simultaneously shaft 3 is also shifted to the right thereby causing teeth 53 and 54 to come into engagement so that now all three main shafts 1, 3 and 2 are directly coupled, all of the gears being out of driving connection and not rotating at all. This means a great advantage, as there is the least resistance and the least noise.

I do not want to be limited to the details described or shown in the drawings, as many variations will occur to those skilled in the art.

What I claim is:

A change speed gear comprising a driving shaft, a driven shaft, an intermediate shaft, said three shafts being substantially in alignment; a lay shaft parallel to said first mentioned shafts; gears loosely surrounding said driving shaft and said intermediate shaft; means for connecting and disconnecting said gears to and from said driving and said intermediate shafts, respectively; gears on said lay shaft adapted to engage with said first mentioned gears; coupling means on said driving shaft for connection with said intermediate shaft, coupling means on said intermediate shaft adapted to co-operate with said coupling means on said driving shaft on adequate shifting of said intermediate shaft; means for shifting said intermediate shaft; and a one-way driving connection between said intermediate shaft and said driven shaft.

ALBERT MAIER.